(12) United States Patent
Phalippou (10) Patent No.: US 11,549,529 B2
(45) Date of Patent: Jan. 10, 2023

(54) FASTENING SYSTEM HAVING TENONS PROVIDED WITH ANGULARLY OFFSET APPENDAGES

(71) Applicant: AIRBUS OPERATIONS (S.A.S.), Toulouse (FR)

(72) Inventor: Jérôme Phalippou, Tournefeuille (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 1235 days.

(21) Appl. No.: 16/017,122

(22) Filed: Jun. 25, 2018

(65) Prior Publication Data

US 2018/0372135 A1 Dec. 27, 2018

(30) Foreign Application Priority Data

Jun. 23, 2017 (FR) ...................................... 1755737

(51) Int. Cl.
*F16B 2/06* (2006.01)
*F16B 5/02* (2006.01)
*B64C 1/18* (2006.01)
*F16B 2/00* (2006.01)

(52) U.S. Cl.
CPC ............... *F16B 2/065* (2013.01); *B64C 1/18* (2013.01); *F16B 5/025* (2013.01); *F16B 5/0225* (2013.01); *F16B 5/0233* (2013.01); *F16B 5/0241* (2013.01); *F16B 2/005* (2013.01)

(58) Field of Classification Search
CPC ........ F16B 5/02; F16B 5/0225; F16B 5/0233; F16B 5/0241; F16B 5/025; F16B 2/065; Y10T 403/50; Y10T 403/51; Y10T 403/36; Y10T 403/364; Y10T 403/362; Y10T 403/32041

See application file for complete search history.

(56) References Cited

U.S. PATENT DOCUMENTS 1,247,642 A * 11/1917 Clark .................... F16D 3/40
                                                   464/170
1,281,531 A    10/1918 Dietrich
5,649,778 A *  7/1997 Lin ..................... B23Q 1/0027
                                                   403/57

(Continued)

FOREIGN PATENT DOCUMENTS

CN      103625631      3/2014
FR      2 872 782      1/2006

OTHER PUBLICATIONS

Search Report for FR 1755737 dated Feb. 27, 2018, 7 pages.

*Primary Examiner* — Daniel J Wiley
(74) *Attorney, Agent, or Firm* — Nixon & Vanderhye P.C.

(57) ABSTRACT

A system for fastening two components is disclosed having a mechanical connection device including two tenons that each extend from an opposite face of an interposed plate, each of the tenons having two appendages forming coupling arms, each appendage being positioned on either side of the tenon. The appendages of one tenon being positioned in a different longitudinal direction than the appendages of the other tenon, each appendage having a coupling component to connect to a device for locking the tenons and two end fittings that each have a slot in which each of the tenons of the connection device is able to be fitted, each appendage protruding out of the slot on either side thereof.

20 Claims, 4 Drawing Sheets

(56) References Cited

U.S. PATENT DOCUMENTS

| | | | | |
|---|---|---|---|---|
| 8,109,048 B2* | 2/2012 | West | ............... | F24S 25/20 |
| | | | | 52/173.3 |
| 8,375,654 B1* | 2/2013 | West | ............... | F24S 25/20 |
| | | | | 52/173.3 |
| 9,673,583 B2* | 6/2017 | Hudson | ............... | H01R 4/64 |
| 2011/0089292 A1 | 4/2011 | Williams et al. | | |

* cited by examiner

FASTENING SYSTEM HAVING TENONS PROVIDED WITH ANGULARLY OFFSET APPENDAGES

CROSS REFERENCE TO RELATED APPLICATION

This application claims priority to and incorporates by reference French Patent Application Number 1755737 filed Jun. 23, 2017.

BACKGROUND

1. Field of the Invention

The present invention is generally related to mechanical fastening systems for assembling two components, and more specifically, to a fastening apparatus for aircraft components.

The disclosure is also related to fastening systems for rapidly assembling and disassembling two components without requiring drilling or adjustment.

2. Description of the Related Art

Aircraft manufacturing and assembly usually requires the components to be attached to one another using rivets and bolts. For example in an aircraft fuselage, the majority of current structures are fitted and held on the fuselage by systems that need to be riveted, thereby making it necessary to carry out operations of machining fastening holes. However, it is desired to avoid any machining operations in the aircraft during the assembly and to provide pre-machined holes.

However, one of the shortcomings of prior art assembly with the holes have been drilled in advance is to ensure that they are aligned with sufficient precision and to ensure satisfactory assembly.

For example, patent FR2872782 filed by Airbus France describes means for fastening a floor comprising a plurality of spars and cross members on an aircraft fuselage. The fastening means comprise notably connecting rods joined to the fuselage with the aid of an end fitting fastened by riveting.

SUMMARY

The present disclosure is to alleviate the problem of assembling two components requiring undesirable machining operations.

The present disclosure is embodied as a device for mechanical connection between two components, wherein the device comprises two tenons that each extend from an opposite face of an interposed plate, each of the tenons having two appendages forming coupling arms, each appendage being positioned on either side of the tenon, the appendages of one tenon being positioned in a different longitudinal direction than the appendages of the other tenon, each of the appendages having means for coupling to a device for locking the tenons.

In an exemplary embodiment, the connecting device appendages of one tenon lie in longitudinal directions that form an angle of approximately 90 degrees and are substantially perpendicular to the appendages of the other tenon.

In an exemplary embodiment, the interposed plate comprises a resilient part.

In an exemplary embodiment, the resilient part is sandwiched between two more rigid parts.

In an exemplary embodiment, the coupling means are in the form of a thread on the appendages.

In an exemplary embodiment, the interposed plate may include two separable parts.

In an exemplary embodiment, each tenon may be a parallelepiped component and each appendage may be in the form of a cylinder.

The present invention is also embodied as a fastening system comprising a mechanical connection device having the features set out above and two end fittings that each have a slot in which each of the tenons of the connection device is able to be fitted, each appendage protruding out of the slot on either side thereof, the slot of one end fitting being positioned in a different longitudinal direction than the slot of the other end fitting.

The fastening system slot may be formed by a cavity between two blocks projecting from the end fitting.

In an exemplary embodiment, each block has a lateral face against which a washer bears, the lateral face having at least partially striations or plurality of ridges and grooves with a shape corresponding to that of the washer.

In an exemplary embodiment, each appendage may lie in a direction perpendicular to the lateral faces of the blocks from which it protrudes.

A nut is provided for each appendage in order to lock the washer to a lateral face of the corresponding blocks.

On one and the same component, the orientation of the slot exhibits a direction that alternates from one end fitting to the next fitting.

The present invention is also embodied as a method for fastening two components together with the aid of a fastening system having the features set out above, wherein the method comprises the following steps of:

positioning a tenon in an end fitting or vice versa;
positioning a second tenon in the other end fitting or vice versa;
fastening the end fittings to the corresponding components, the end fitting being able to be fastened before or after the tenon has been positioned; and,
locking the tenons to the end fittings with the aid of the locking device.

The method may also comprise a step of assembling separable parts.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Figure 1:
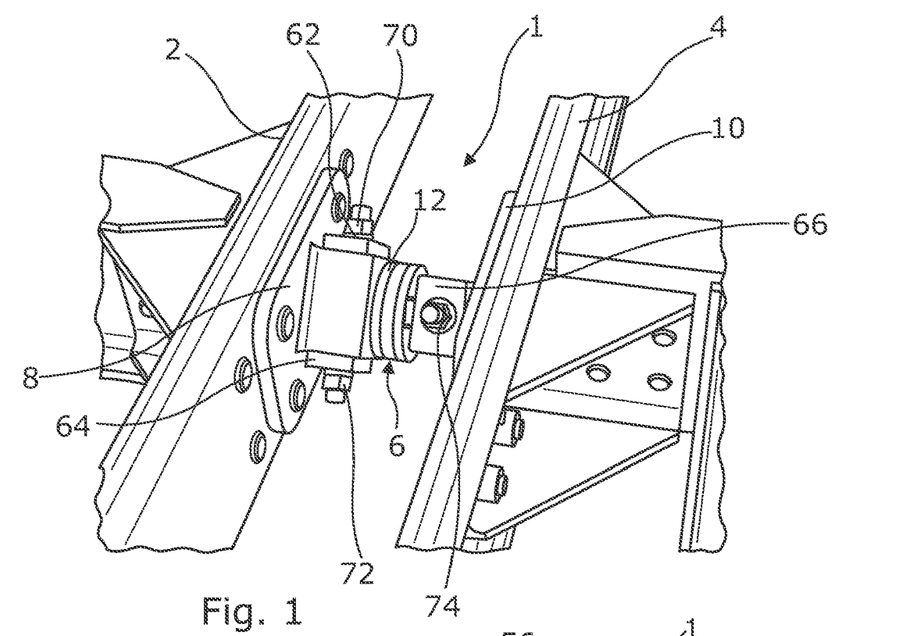
FIG. 1 shows a perspective view of the fastening system between two components in accordance with an exemplary embodiment of the present invention.
Figure 2:
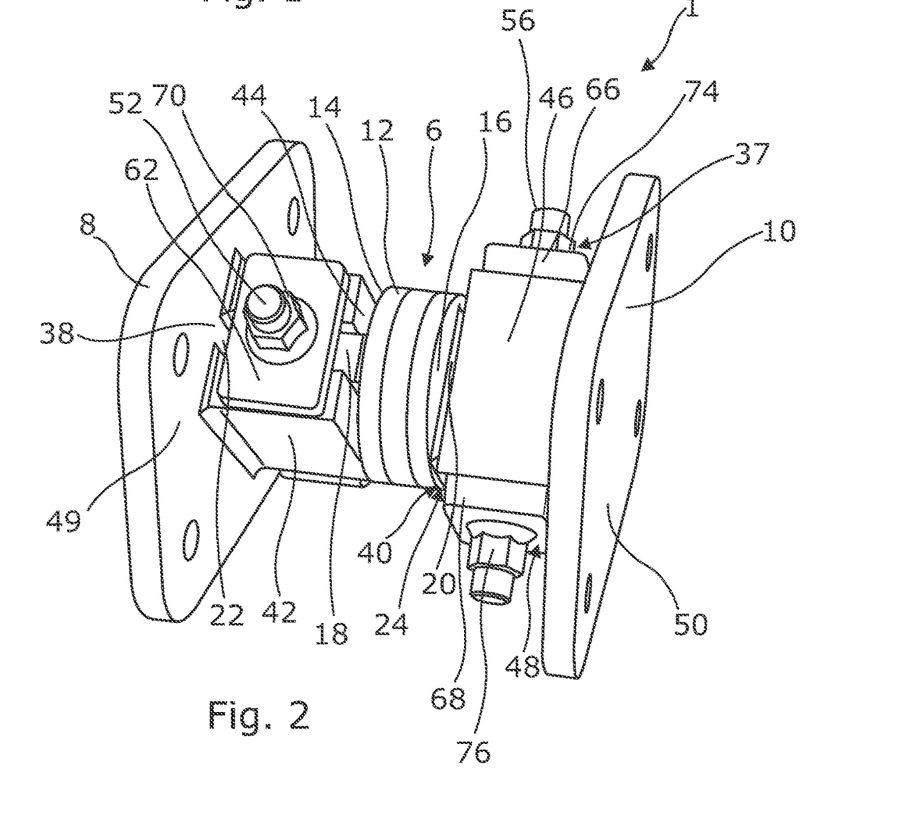
FIG. 2 shows a perspective view of the fastening system depicted in FIG. 1.

Referring to FIGS. 1 and 2, a fastening system 1 according to the present invention is shown for assembling two components 2 and 4 without it being necessary to carry out any drilling or adjustment or wedging at the time of fitting.

The fastening system 1 comprises a mechanical connection device 6 joined to two end fittings 8, 10 that are coupled to the components 2 and 4, respectively. The mechanical connection device 6 comprises an interposed plate 12 having a face 14 and an opposite face 16 opposite one another on which two tenons 18, 20 are located, respectively. The tenons 18, 20 extend from the plate 12 in one and the same orientation but in opposite directions.

Figure 7:
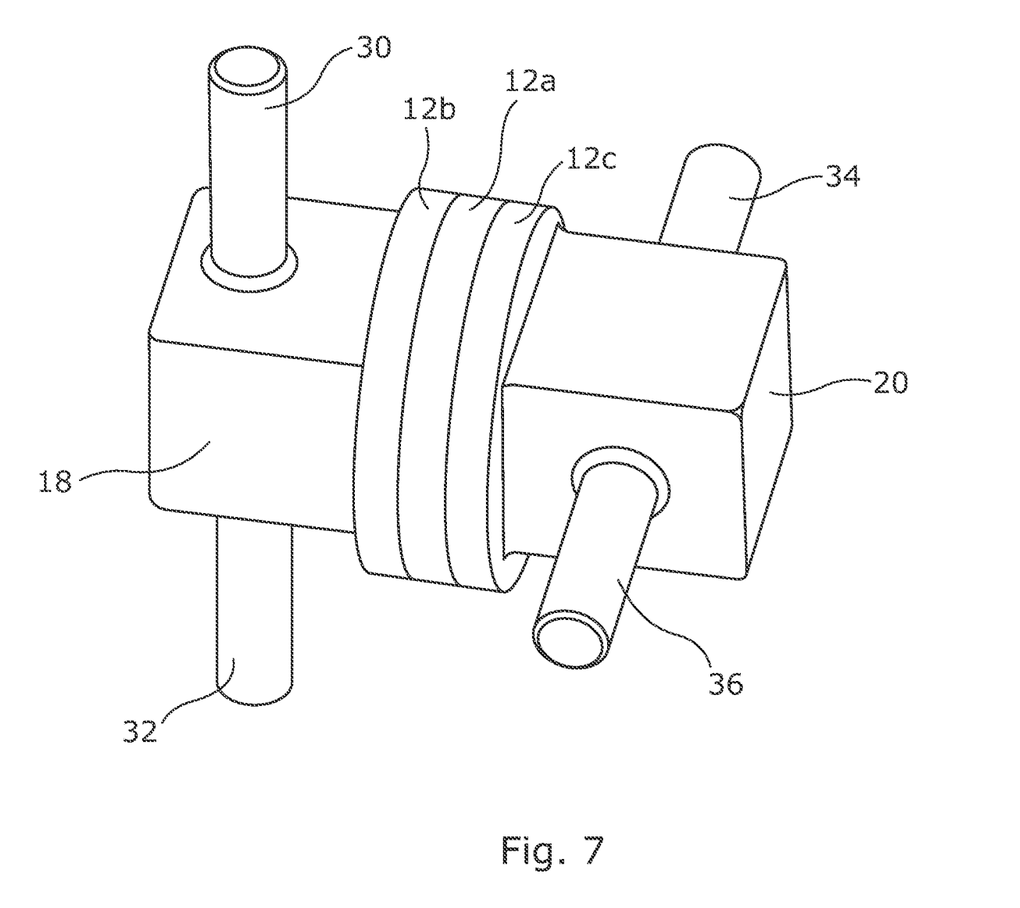

As shown in FIGS. 1 to 4, the tenons 18, 20 project outwardly from the respective opposite faces 14, 16 of the interposed plate 12. The tenons 18 and 20 can have any kind of form that makes it possible to achieve the expected function, namely, as will be seen below, of being able to be fitted into a slot or groove 22 or 24, respectively, in the end fitting joined to the component 2 or 4 in order to keep the tenon in a given position. Any other form that allows fitting in a slot and abutment in order to immobilize the device is contemplated to be within the scope of the disclosure. Other shapes and configurations of the tenons, as seen, for example in FIG. 7, are contemplated to be within the scope of the present disclosure. The tenon may for example be in the form of a cube (see FIG. 7) but also any other form that may have curves, inclinations, or the like. Each tenon 18, 20 has a bottom face 18a, 20a, respectively, by way of which it is connected to the interposed plate 12.

In the embodiment illustrated in FIGS. 1 to 4, each tenon 18, 20 is in the form of a parallelepiped of rectangular cross section. The bottom face 18a, 20a has a rectangular shape, the longitudinal direction of which corresponds to that of its length. The two parallelepiped tenons 18, 20 are offset from one another by angle of approximately 90 degrees. More specifically, this means that the central longitudinal plane of symmetry of the tenon 18 is substantially perpendicular to the central longitudinal plane of symmetry of the tenon 20. Each tenon 18, 20 has six faces: a bottom face 18a, 20a, a free face 18b, 20b on the opposite side from the bottom face 18a, 20a, two main faces 18c, 18d, 20c, 20d, and two lateral faces 18e, 18f, 20e, 20f. The tenons 18, 20 are fastened to the interposed plate 12 and are connected to the latter by their bottom face 18a, 20a. The tenons 18, 20 may also be integrally formed with the interposed plate 12 as one piece. The lateral faces 18c, 18d, 20c, 20d of the tenons have a flat surface in the embodiment illustrated but could be at least partially convex. As will be seen below, the convexity of the lateral faces makes it possible to make up for poor alignment between the set of elements and in particular the components 2, 4 to be assembled.

In the embodiment illustrated, the interposed plate 12 is in the form of a cylinder having a circular cross section. The plate 12 could have any other kind of form having two faces 14, 16 for bearing each tenon 18, 20 on opposite sides of the plate. In the embodiment illustrated, the faces 14 and 16 are parallel, but other configurations are also contemplated to be within the scope of the present invention.

The plate 12 may be a single rigid block or comprise a resilient part 12a. The resilient part is disposed between the two faces 14, 16 bearing the tenons. The resilient part 12a of the interposed plate 12 is able to be formed in multiple ways, for example through the use of a resilient material, but it could also be realized by springs, actuating cylinders or any other mechanism that provides a resilient region between the tenons 18, 20 engaged with the components to be assembled. The resilient part 12a makes it possible notably to make up for a poor alignment or tolerances between all the elements used for the assembly. The resilient part 12a also makes it possible to filter the vibrations that are transmitted through the component(s) to be assembled and originate from a vibrating environment.

In an exemplary embodiment, the plate may comprise three parts: two end disks 12b, 12c and a central disk 12a. The faces bearing the tenons correspond to the opposite free end faces of the end disks 12b and 12c. The disks 12a, 12b, 12c are identical cylindrical blocks each having a circular cross section that together integrally form the interposed plate 12; the central disk 12a is made of a resilient material such as, for example an elastomer. The resilient disk 12a is sandwiched between the disks 12b and 12c. The disks 12b, 12c are made of a rigid material, for example, identical to that of the tenons.

Figure 4:
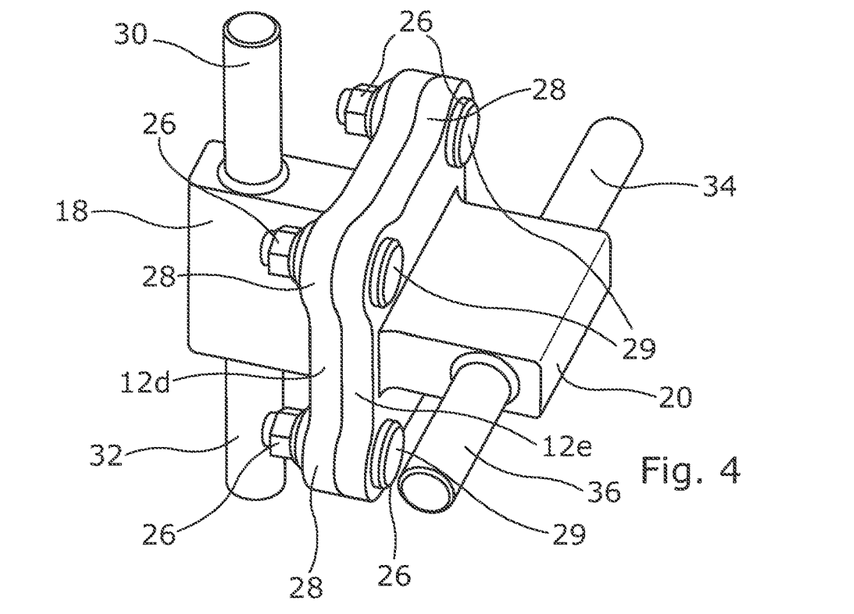
FIG. 4 shows a perspective view of a mechanical connection device of the fastening system in accordance with another exemplary embodiment in which the interposed plate is separable into two parts.

In another exemplary embodiment illustrated in FIG. 4, the interposed plate 12 may comprise two separable parts 12d, 12e that can be assembled together and dismantled quickly and easily while ensuring a solid joint once put together. The two parts 12d, 12e may include a resilient part 12a sandwiched between the two parts 12d, 12e when assembled together, but as shown in the embodiment of FIG. 4, the two parts 12d, 12e may form the interposed plate 12 without the resilient part.

In the case of two separable parts 12d, 12e, the assembly means may be in the form of a screw/nut system 26. Holes 29 are made for the passage and the fastening of the screw/nut system 26. In the embodiment illustrated, each part 12d, 12e may include a plurality of outwardly projecting corner lugs 28 provided each having a hole 29 for the passage and the fastening of the screw/nut system 26. The lugs 28 of the part 12d for the one part and the part 12e for the other part are provided in a corresponding manner for assembly.

In the case of two parts 12d, 12e between which a resilient part 12a is provided, the hole 29 in the lugs 28 has a form that allows excursion of the screw in order to preserve the resilient aspect of the resilient part 12a. The hole could for example have an oblong profile.

Figure 3:
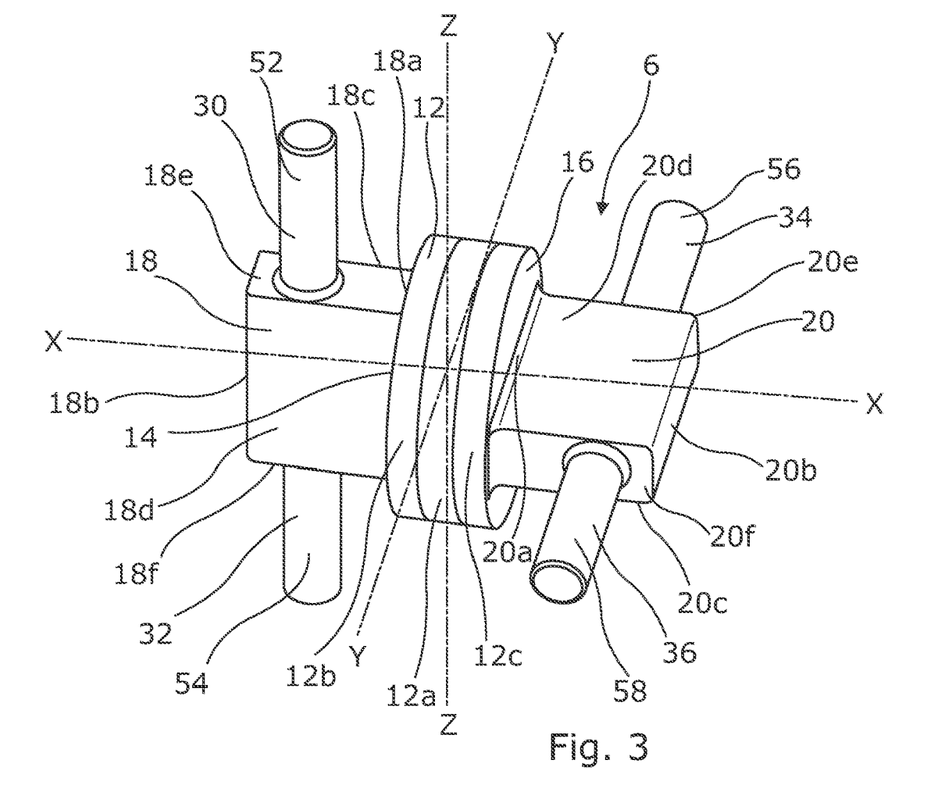
FIG. 3 shows a perspective view of a mechanical connection device of the fastening system depicted in FIGS. 1 and 2.

Referring now FIG. 3, the axis X-X corresponds to the central transverse axis of the tenons 18, 20 and the central axis of the interposed plate 12. The axis Y-Y is a radial axis with respect to the plate 12, on the same plane as the central longitudinal axis of symmetry of the bottom face of the tenon 20, passing through the axis X-X. The axis Z-Z corresponds to an axis passing through the axes X-X and Y-Y, on the same plane as the central longitudinal axis of symmetry of the bottom face of the tenon 18. The three axes X-X, Y-Y and Z-Z are mutually orthogonal and their intersection corresponds to the center of the interposed plate 12.

Tenon 18 comprises two appendages 30, 32 and tenon 20 comprises two appendages 34, 36 forming coupling arms on either side of each tenon. The appendages 30, 32, 34, 36 extend from the lateral faces 18e, 18f, 20e, 20f, respectively, in a direction parallel to the bottom face of the respective tenon either in the direction of the axis Z-Z for the appendages 30, 32 or in the direction of the axis Y-Y for the appendages 34, 36. Each of the appendages 30, 32, 34, 36 has means for coupling to a device for locking the tenons in a direction perpendicular to the bottom face of the tenons and to the interposed plate 12, i.e. in the direction of the axis X-X.

Each appendage 30, 32, 34, 36 has any kind of form that makes it possible to afford said coupling means. The appendages are fastened to or in one piece with the corresponding tenon. The appendages 30, 32, 34, 36, are in the form of a cylinder having a circular cross section, the diameter of which has a dimension less than the width of the lateral face of the corresponding tenon 18e, 18f, 20e, 20f, respectively. In the embodiment illustrated, the axes of the appendages 30, 32, 34, 36 are coincident, parallel to the plate 12 and perpendicular to the lateral faces of the tenons 18e, 18f, 20e, 20f, respectively.

It is possible for the appendages 30, 32 (or 34, 36) of a single tenon not to be aligned with one another. It is also possible for them not to lie in directions parallel to the bottom face of the tenon and to the plate 12. As will be seen below, they have to lie in a direction that allows joining to a locking device.

As best seen in FIGS. 1 and 2, the tenons 18, 20 are intended to be fitted in a slot 22, 24, respectively, borne by the end fitting 8 or 10, respectively. The fittings 8, 10 are intended to be fastened and assembled to the components 2, 4, respectively. Each slot 22, 24 is formed by a cavity 38, 40, respectively, formed between two blocks 42, 44, 46, 48, respectively, projecting from the general surface of the end fitting and, in the embodiment illustrated, to a flat surface of the end fitting 8, 10, respectively. In the embodiment illustrated, the end fitting is in the overall form of a parallelepiped having a rectangular cross section and having a small height compared with its length and width in order to have the overall shape of a plate. The blocks 42, 44, 46, 48, respectively, project from the main flat surface 49, 50, respectively, of the plate.

Figure 5:
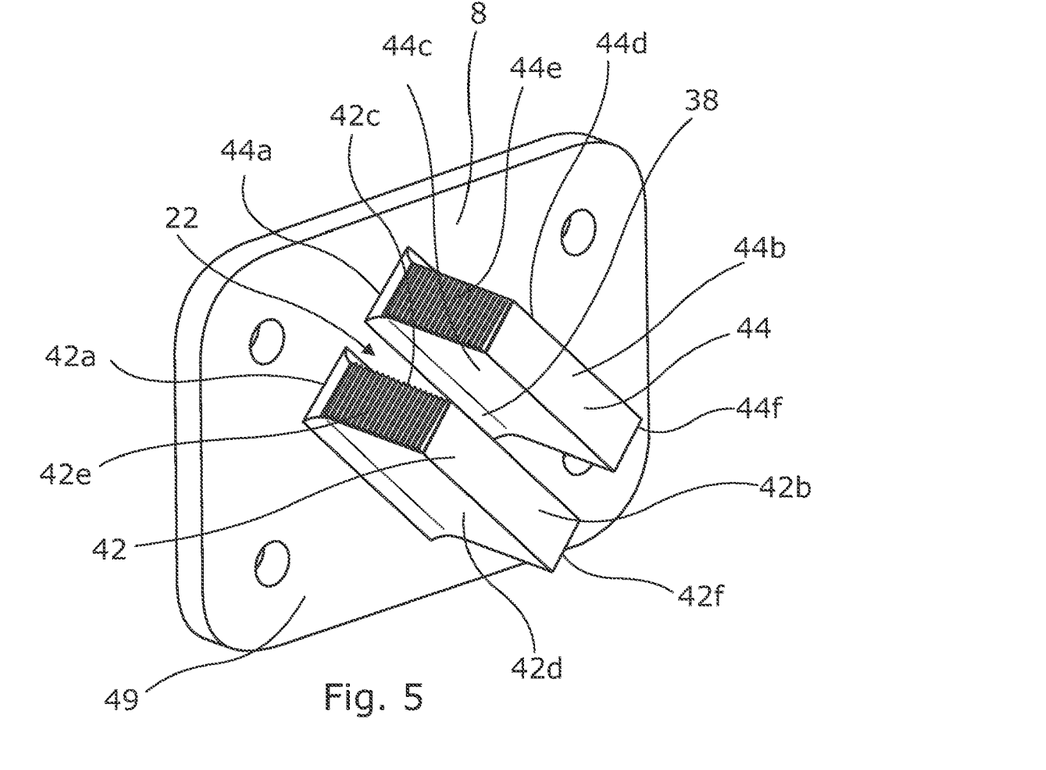
FIG. 5 shows a perspective view of an end fitting of the fastening system depicted in FIGS. 1 and 2.
Figure 6:
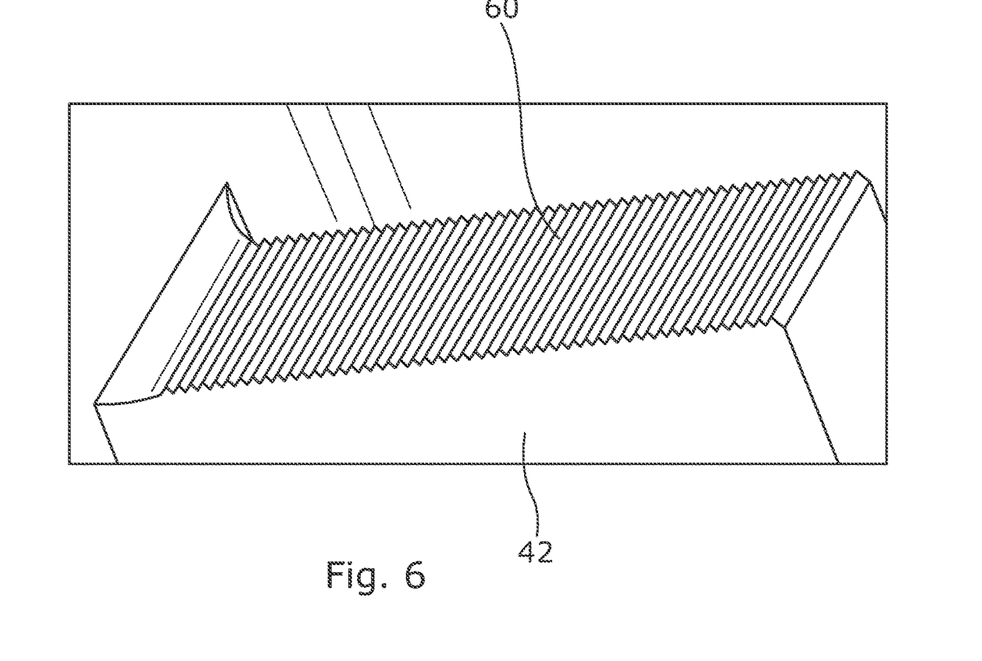
FIG. 6 shows an enlarged partial perspective view of the striations formed on the blocks of the end fitting depicted in FIG. 5; and, FIG. 7 shows a perspective view of another exemplary embodiment of the connection device in which the tenon is in the form of a cube.

Referring now to FIG. 5, an exemplary embodiment of the blocks 44, 44 of the end fitting 8 will be described, and it is understood that everything that is described for the blocks of the end fitting 8 is applicable to those of the end fitting 10. The blocks 42, 44 borne by the end fitting 8 are in the form of a parallelepiped of rectangular cross section of the same dimensions. They are spaced apart from one another and parallel to one another so as to create a cavity 38 having a shape corresponding to the shape of tenon 18. Each block 42, 44 has six faces: a bottom face 42a, 44a, a free face 42b, 44b on the opposite side from the face 42a, 44a, an inner face 42c, 44c, an outer face 42d, 44d, and two lateral faces 42e, 42f, 44e, 44f. The bottom face 42a, 44a is connected to the end fitting 8. The free faces 42b, 44b face the intermediate plate 12 when the tenon 12 is fitted in the slot 22. The inner face 42c of the block 42 is parallel to and faces the inner face 44c of the block 44. These inner faces 42c, 44c are in contact with the tenon 18 when it is fitted in the slot 22. The outer faces 42d, 44d are the faces on the opposite side from the inner faces 42c, 44c, respectively. The longitudinal dimension of the blocks 42, 44 which corresponds to the length of the lower face of the base 42a, 44a is greater than that of the tenon 18 which corresponds to the length of the bottom face 18a such that the cavity 38 partially receives the appendages 30, 32.

Referring back to FIGS. 1 and 2, the appendages 30, 32 or 34, 36 protrude out of the cavity 38 or 40, respectively, on either side of the latter, beyond the lateral faces of the blocks. The ends 52, 54, 56, 58 of the appendages 30, 32, 34, 36, respectively, protruding out of the cavity 38 or 40, respectively, make it possible to fit a device 37 for locking the connection device 6 in order to keep the tenon 18 or 20 in position inside the cavity 38 or 40, respectively. The ends of the appendages and the lateral faces of the blocks have means for coupling to the locking device 37. The locking device 37 makes it possible to immobilize and release the connection device 6 inside the slot quickly and easily without it being necessary to drill one component.

The coupling means for each block 42, 44 is in the form of a thread on the ends 52, 54, 56, 58 of the appendages and striations or plurality of grooves and ridges 60 on the lateral faces of the blocks 42, 44. The striations 60 are formed by a succession of recesses or grooves and ridges with a shape complementary to those of the striations made on a washer 62, 64, 66, 68. Each washer 62, 64, 66, 68 has a shape such that it at least partially covers the surface of the lateral faces 62, 64, 66, 68 of the two blocks 42, 44 of the end fitting. The covering area of the washer on the lateral faces, i.e. the faces 42e, 42f, 44e, 44f for those depicted in FIG. 5 has to be sufficient to allow the washer to bear sufficiently against the blocks in order to lock the fastening system. In the embodiment illustrated, each washer is parallelepiped having a rectangular cross section and its length is such that the ends thereof correspond to the ends of the outer faces of the blocks. In this way, when the washer 62, 64,66, 68 is positioned on the corresponding blocks 42, 44,46, 48 respectively, the outer faces of the washer that are contiguous with the outer faces of the blocks are located at the same level in order to form a single surface without any discontinuity.

However, it is also contemplated that the end faces of the washers not to be located at the same level as the outer faces of the blocks. The width of the washer is less than the length of the lateral face of the block so as to make it possible to change the position of the washer from one striation to another without the washer protruding beyond the free surface of the blocks. The washer is pierced with a central hole of circular shape, the diameter of which corresponds at least to the diameter of the appendage such that the appendage can be fitted into the central hole of the washer. When the washer slides along the appendage and comes into contact with the lateral faces of the blocks, the striations on the washer and on the lateral faces of the blocks, respectively, engage with one another and prevent the connection device 6 from moving in translation in the direction of the axis X-X which corresponds to the direction followed by the connection device in order to insert the tenons into the slots and to remove them therefrom. In the embodiment illustrated, in order to allow optimal immobilization in the direction of the axis X-X, the striations 60 are in a longitudinal direction perpendicular to the direction of the axis X-X, this direction being the direction followed by the tenon in order to be removed from the slot.

Each appendage end 52, 54, 56, 58, comprises a threaded portion corresponding to inner threads of each nut 70, 72, 74, 76, respectively, making it possible to immobilize the washer 62, 64, 66, 68, respectively, against the lateral faces of the blocks by tightening. As seen above, the appendages have to lie in a direction that allows joining to a locking device. The direction of each appendage is perpendicular to the lateral face of the corresponding block against which the nut connected to the appendage in question presses the washer. A locking system may be added in the form for example of self-locking nuts (70, 72, 74, 76) or any other known system.

The fastening system is now described. Referring to FIGS. 1 to 3, on the components to be assembled and the environment in which they are assembled, the form of the device 6 and the manner of carrying out the assembly can be different. When the environment allows enough room to move one component 2 with respect to another component 4, the connection device 6 can be used in its integral form. One of the tenons 18, 20 of the device 6 is inserted into the slot of an end fitting fastened to a first component. The second component is then moved in order to insert the other tenon that has remained free into the slot of the end fitting of this second component. Once the tenons are in position, locking in position is carried out with the aid of the nuts, which are slid along the thread on the appendages until the striations of the washers bear against the striations of the blocks of the end fittings. Once the nuts have been tightened and optionally locked, the components are assembled.

In accordance with an exemplary embodiment shown in FIG. 4, the device 6 could be in the form of two separable parts 12d, 12e, but this embodiment is more advantageous in the following case: If it is difficult to move the components with respect to one another, two assembly methods with the aid of the fastening system 1 are possible:

using a device 6 having two separable parts. In this case, each of the parts is positioned in the associated end fitting and the assembly consists in joining the two parts together at the interposed plate and then locking them to the end fittings;

using the connection device in its integral form. In this case, it is necessary for at least one of the end fittings, referred to as free end fitting, not to be fastened to the corresponding component in order that the device can be fitted. If the end fitting has already been fastened, it is possible to remove it in order to effect the assembly. First of all, one of the tenons is fitted in the end fitting fastened to one of the components. It is possible for the two end fittings not to be positioned, in which case the end fitting is fastened at first. The tenon is inserted into the end fitting either before fastening or after fastening. Once the tenon is in position, the free end fitting is slid from the lateral faces of the other tenon in order that the blocks are positioned around this other tenon and then the end fitting is fastened to the corresponding component. Assembly is finished by locking the device to the end fittings. It may also be possible to place the end fittings around the tenons, position the assembly between the two components and then fasten the two end fittings to the corresponding components.

It is possible to use several connection devices to produce an assembly. In this case, the end fittings joined to one and the same component can all be equivalent or exhibit differences notably in the orientation of the slots. In the case of end fittings with differently oriented slots, it is possible to alternate between an end fitting in which the slot exhibits a direction orthogonal to the next end fitting and so on. In the case of components that lie in a terrestrial frame of reference, in which the vertical direction corresponds to the direction perpendicular to the ground, the end fittings can alternately have a slot at +45 degrees to the vertical and a slot at −45 degrees to the vertical. That is, the end fittings have slots that are differently oriented relative to one another, the end fittings may alternate in which the slot for each end fitting is in a substantially perpendicular direction to the slot in the adjoining end fitting.

In order to correct the positioning or machining tolerances or defects during assembly, it is possible to act separately or in combination on the following various elements provided at the connection device 6:

the possible moving of the appendage inside the slot, which makes it possible to move the device in the direction of the axis Z-Z or Y-Y;

the movement of the washer from one striation to another on the block, which makes it possible to move the device in the direction of the axis X-X;

the convexity of the lateral faces of the tenon, which makes it possible to ensure a defect of orthogonality of the end fittings;

in the case in which the device comprises a resilient part, the resilient part makes it possible to make up for defects in all directions and, for example, a defect of relative orientation between the slots of the associated end fittings.

The fastening system 1 thus ensures stress-free assembly on account of all of the possible adjustments and adaptations. Prior to connecting the components 2, 4 together using the connection device washers and nuts, the tenons 18, 20 are configured to slide within the slots 22, 24, respectively, to adjust the components. In addition to ensuring all these corrections, the fastening system 1 allows the transmission of forces through the assembly in directions parallel to the axes X-X, Y-Y and Z-Z. The transmission of forces in the direction of the axes Y-Y and Z-Z is ensured by the tenons 18 and 20, respectively, and the slots 22 and 24, respectively, and the transmission of forces along X-X is ensured by the striations 60, the washers, and the appendages of the device 6. The constituent elements of the fastening system 1 can be oriented in dependence on the forces to be passed. In the embodiment illustrated, the tenons are offset by approximately 90 degrees.

The fastening system can be used in diverse and varied applications in order to fasten one structure to another of any type. In the aviation sector, notably, the system can be used for example to fasten an electrical cabinet, a roller, a hydraulic block or the like to the primary structure of an aircraft. As seen above, according to another possible example, the system could also be used to fasten the floor to the fuselage. The system can be used in any other technical field without limitation. Regardless of the technical field and the use made thereof, the fastening system provides, as an advantage, the transmission of forces in three different directions, and the correction of assembly, positioning and machining tolerances in the three directions. It makes it possible to fit one structure on another and remove it therefrom very easily and very quickly without machining, drilling or wedging. It is no longer necessary to provide interchangeable equipment for fastening reasons: it is possible to exchange one component for another and to retain the same fastening system without requiring any readjustment. When the device comprises a resilient part, the fastening system makes it possible to filter the vibrations communicated by the components to be assembled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority

The invention claimed is:

1. A mechanical connection device for connecting two components, comprising:
   two tenons each extending from an opposite face of an interposed plate,
   wherein the interposed plate comprises a resilient part interposed between a first rigid part and a second rigid part,
   each tenon having two appendages forming coupling arms,
   each appendage being positioned on either side of their respective tenon, the appendages of one tenon being positioned in a different longitudinal direction than the appendages of the other tenon, and
   each of the appendages having a locking device for locking the tenons.

2. The device according to claim 1, wherein the appendages of one tenon lie in longitudinal directions that form an approximately 90 degrees angle to the appendages of the other tenon.

3. The device according claim 1, wherein the locking device is in the form of a thread on the appendages.

4. The device according to claim 3, wherein the interposed plate comprises two separable parts.

5. The device according to claim 4, wherein each tenon is in the form of a parallelepiped and each appendage is in the form of a cylinder.

6. A fastening system comprising a mechanical connection device according to claim 1, comprising:
   two end fittings each having a slot in which each of the tenons of the device is able to be fitted through the respective slot, each appendage protruding out of the slot on either side thereof, and
   wherein the slot of one end fitting being positioned in a different longitudinal direction than the slot of the other end fitting.

7. The fastening system according to claim 6, wherein the slot is formed by a cavity between two blocks projecting from the end fitting.

8. The fastening system according to claim 7, wherein each block has a lateral face against which a washer bears, the lateral face having at least partially striations with a shape corresponding to that of the washer.

9. The fastening system according to claim 8, wherein each appendage lies in a direction perpendicular to the lateral faces of the blocks from which it protrudes.

10. The fastening system according to claim 9, wherein a nut is provided for each appendage in order to lock the washer to a lateral face of the corresponding block.

11. An assembly of two components, comprising: a fastening system according to claim 6, wherein the orientation of the slot alternates from one end fitting to the second end fitting.

12. A method for fastening two components together using the fastening system according to claim 6, comprising:
   positioning a tenon in an end fitting or vice versa;
   positioning the other tenon in the other end fitting or vice versa;
   fastening the end fittings to the corresponding components, the end fitting being able to be fastened before or after the tenon has been positioned; and,
   locking the tenons to the end fittings with the aid of the locking device.

13. The fastening method according to claim 12, wherein the interposed plate comprises a two separable parts, and further comprising assembling the two separable parts together.

14. A connector for connecting two components, comprising:
   a first tenon;
   a second tenon attached to the first tenon;
   an interposed plate having a first plate, a second plate, and a resilient member disposed between the first and second plates,
   the first tenon having a first rod and a second rod extending opposite the first rod, and the second tenon having a first rod and a second rod extending opposite the first rod; and,
   a locking device for attaching the first and the second tenons to first and second components, respectively.

15. The connector of claim 14, wherein the first tenon is attached to an outer face of the first plate and the second tenon is attached to an outer face of the second plate.

16. The connector of claim 14, wherein the first and second rods of the first appendage extend in a plane substantially perpendicular to a plane of the first and second rods of the second appendage.

17. The connector of claim 16, further comprising a first end fitting having a pair of blocks forming a first slot therebetween, a second end fitting having a pair of blocks forming a second slot therebetween, wherein the first tenon is configured to be disposed within the first slot and the second tenon is configured to be disposed within the second slot.

18. The connector of claim 17, wherein each of the first and second rods of the first and second appendages comprises a threaded end configured to receive a washer and a nut to secure the appendages to the corresponding block.

19. A mechanical connection device for connecting two components, comprising:
   a pair of tenons each extending from an opposite face of an interposed plate,
   each of said pair of tenons having a first and second appendages forming coupling arms,
   each of the first and second appendages being positioned on either side of their respective tenon, the appendages of one tenon being positioned in a different longitudinal direction than the appendages of the other tenon, and
   each of the first and second appendages comprises a threaded end configured to receive a washer and a nut to secure the appendages to a corresponding block.

20. A mechanical connection device for connecting two components, comprising:
   a pair of tenons each extending from an opposite face of an interposed plate,
   each of said pair of tenons having a first and second appendages forming coupling arms,
   each of the first and second appendages being positioned on either side of their respective tenon, the appendages of one tenon being positioned in a different longitudinal direction than the appendages of the other tenon, and
   two end fittings each having two blocks projecting therefrom, wherein each block has a lateral face against which a washer bears, the lateral face having at least partially striations with a shape corresponding to that of the washer.

* * * * *